US008769591B2

(12) United States Patent
Gahm et al.

(10) Patent No.: US 8,769,591 B2
(45) Date of Patent: Jul. 1, 2014

(54) FAST CHANNEL CHANGE ON A BANDWIDTH CONSTRAINED NETWORK

(75) Inventors: Joshua Bernard Gahm, Newtonville, MA (US); David R. Oran, Acton, MA (US); Kapil Sharma, Acton, MA (US)

(73) Assignee: Cisco Technology, Inc., San Jose, CA (US)

(*) Notice: Subject to any disclaimer, the term of this patent is extended or adjusted under 35 U.S.C. 154(b) by 827 days.

(21) Appl. No.: 11/674,093

(22) Filed: Feb. 12, 2007

(65) Prior Publication Data
US 2008/0192839 A1   Aug. 14, 2008

(51) Int. Cl.
*H04N 7/173* (2011.01)

(52) U.S. Cl.
USPC ............. 725/95; 725/34; 725/90; 725/91; 725/92; 725/93; 725/94; 725/96; 725/97; 725/98; 725/99; 725/100; 725/101; 370/486; 709/224

(58) Field of Classification Search
None
See application file for complete search history.

(56) References Cited

U.S. PATENT DOCUMENTS

| | | |
|---|---|---|
| 3,840,862 A | 10/1974 | Ready |
| 4,291,196 A | 9/1981 | Spaniol et al. |
| 4,426,682 A | 1/1984 | Riffe et al. |
| 4,802,085 A | 1/1989 | Levy et al. |
| 4,811,203 A | 3/1989 | Hamstra |
| 5,155,824 A | 10/1992 | Edenfield et al. |
| 5,307,477 A | 4/1994 | Taylor |
| 5,444,718 A | 8/1995 | Ejzak et al. |
| 5,483,587 A | 1/1996 | Hogan et al. |
| 5,524,235 A | 6/1996 | Larson et al. |
| 5,551,001 A | 8/1996 | Cohen et al. |
| 5,600,366 A | 2/1997 | Schulman |
| 5,600,663 A | 2/1997 | Ayanoglu et al. |
| 5,636,354 A | 6/1997 | Lear |
| 5,673,253 A | 9/1997 | Shaffer |
| 5,729,687 A | 3/1998 | Rothrock et al. |
| 5,734,861 A | 3/1998 | Cohn et al. |
| 5,784,362 A | 7/1998 | Turina |
| 5,828,844 A | 10/1998 | Civanlar |
| 5,870,763 A | 2/1999 | Lomet |
| 5,914,757 A | 6/1999 | Dean et al. |
| 5,926,227 A | 7/1999 | Schoner et al. |
| 5,933,195 A | 8/1999 | Florencio |

(Continued)

FOREIGN PATENT DOCUMENTS

| | | |
|---|---|---|
| CN | 1490976 | 4/2004 |
| CN | 1643857 A | 7/2005 |

(Continued)

OTHER PUBLICATIONS

Nguyen, Thinh and Avideh, Protocols for Distributed Video Streaming, Image Processing, 2002 Proceedings. 2002 Int, Dec. 10, 2002, vol. 3, 185-188, ISBN: 0-7803-7622-6.

(Continued)

*Primary Examiner* — Joshua Taylor
(74) *Attorney, Agent, or Firm* — Merchant & Gould, P.C.

(57) ABSTRACT

In one embodiment, a buffering server transfers a dynamic burst transfer of data encoded using an inter-coded compression technique. The dynamic burst transfer is timed so that an initial transfer rate is reduced to a remaining transfer rate at the same time or before a decoding endpoint joins a corresponding data stream. The decoding endpoint merges the video stream and the dynamic burst transfer to decode and quickly reconstruct a displayable video frame.

20 Claims, 4 Drawing Sheets

(56) References Cited

U.S. PATENT DOCUMENTS

| | | |
|---|---|---|
| 5,933,593 A | 8/1999 | Arun et al. |
| 5,963,217 A | 10/1999 | Grayson et al. |
| 5,974,028 A | 10/1999 | Ramakrishnan |
| 6,003,116 A | 12/1999 | Morita et al. |
| 6,031,818 A | 2/2000 | Lo et al. |
| 6,034,746 A | 3/2000 | Desai et al. |
| 6,065,050 A | 5/2000 | DeMoney |
| 6,119,205 A | 9/2000 | Wicki et al. |
| 6,137,834 A | 10/2000 | Wine et al. |
| 6,141,324 A | 10/2000 | Abbott et al. |
| 6,151,636 A | 11/2000 | Schuster et al. |
| 6,236,854 B1 | 5/2001 | Bradshaw |
| 6,278,716 B1 | 8/2001 | Rubenstein |
| 6,289,054 B1 | 9/2001 | Rhee |
| 6,301,249 B1 | 10/2001 | Mansfield et al. |
| 6,332,153 B1 | 12/2001 | Cohen |
| 6,445,717 B1 | 9/2002 | Gibson et al. |
| 6,501,739 B1 | 12/2002 | Cohen |
| 6,516,435 B1 | 2/2003 | Tsunoda |
| 6,532,562 B1 | 3/2003 | Chou et al. |
| 6,567,929 B1 | 5/2003 | Bhagavath et al. |
| 6,570,926 B1 | 5/2003 | Agrawal et al. |
| 6,594,798 B1 | 7/2003 | Chou et al. |
| 6,608,820 B1 | 8/2003 | Bradshaw |
| 6,608,841 B1 | 8/2003 | Koodli |
| 6,624,841 B1 | 9/2003 | Buchner et al. |
| 6,643,496 B1 | 11/2003 | Shimoyama et al. |
| 6,650,652 B1 | 11/2003 | Valencia |
| 6,671,262 B1 | 12/2003 | Kung et al. |
| 6,675,216 B1 | 1/2004 | Quatrano et al. |
| 6,677,864 B2 | 1/2004 | Khayrallah |
| 6,711,128 B1 | 3/2004 | Ramakrishnan |
| 6,721,290 B1 | 4/2004 | Kondylis et al. |
| 6,735,572 B2 | 5/2004 | Landesmann |
| 6,744,785 B2 | 6/2004 | Robinett et al. |
| 6,766,418 B1 | 7/2004 | Alexander |
| 6,771,644 B1 | 8/2004 | Brassil et al. |
| 6,775,247 B1 | 8/2004 | Shaffer et al. |
| 6,782,490 B2 | 8/2004 | Maxemchuk et al. |
| 6,792,047 B1 | 9/2004 | Bixby |
| 6,804,244 B1 | 10/2004 | Anandakumar et al. |
| 6,816,469 B1 | 11/2004 | Kung et al. |
| 6,823,470 B2 | 11/2004 | Smith et al. |
| 6,839,325 B2 | 1/2005 | Schmidl et al. |
| 6,865,157 B1 | 3/2005 | Scott et al. |
| 6,865,540 B1 | 3/2005 | Faber et al. |
| 6,876,734 B1 | 4/2005 | Summers et al. |
| 6,909,718 B1 | 6/2005 | Aramaki et al. |
| 6,910,148 B1 | 6/2005 | Ho et al. |
| 6,925,068 B1 | 8/2005 | Stanwood et al. |
| 6,931,001 B2 | 8/2005 | Deng |
| 6,931,113 B2 | 8/2005 | Ortel |
| 6,937,569 B1 | 8/2005 | Sarkar et al. |
| 6,947,417 B2 | 9/2005 | Laursen et al. |
| 6,956,828 B2 | 10/2005 | Simard et al. |
| 6,959,075 B2 | 10/2005 | Cutaia et al. |
| 6,976,055 B1 | 12/2005 | Shaffer et al. |
| 6,989,856 B2 | 1/2006 | Firestone et al. |
| 6,996,097 B1 | 2/2006 | Chou et al. |
| 7,003,086 B1 | 2/2006 | Shaffer et al. |
| 7,007,098 B1 | 2/2006 | Smyth et al. |
| 7,024,609 B2 | 4/2006 | Wolfgang et al. |
| 7,084,898 B1 | 8/2006 | Firestone et al. |
| 7,114,002 B1 | 9/2006 | Okumura et al. |
| 7,127,487 B1 | 10/2006 | Wang et al. |
| 7,164,680 B2 | 1/2007 | Loguinov |
| 7,180,896 B1 | 2/2007 | Okumura et al. |
| 7,224,702 B2 | 5/2007 | Lee |
| 7,234,079 B2 | 6/2007 | Cheng et al. |
| 7,257,664 B2 | 8/2007 | Zhang |
| 7,263,075 B2 | 8/2007 | Roh et al. |
| 7,296,205 B2 | 11/2007 | Curcio et al. |
| 7,324,527 B1 | 1/2008 | Fraas et al. |
| 7,333,439 B2 | 2/2008 | Itoh et al. |
| 7,366,172 B2 | 4/2008 | Chou et al. |
| 7,373,413 B1 | 5/2008 | Nguyen et al. |
| 7,376,880 B2 | 5/2008 | Ichiki et al. |
| 7,379,653 B2 | 5/2008 | Yap et al. |
| 7,392,424 B2 | 6/2008 | Ho et al. |
| 7,397,759 B2 | 7/2008 | Tan et al. |
| 7,532,621 B2 | 5/2009 | Birman et al. |
| 7,562,277 B2 | 7/2009 | Park et al. |
| 7,599,363 B2 | 10/2009 | Jang et al. |
| 7,676,591 B2 | 3/2010 | Chan et al. |
| 7,681,101 B2 | 3/2010 | Oran et al. |
| 7,697,514 B2 | 4/2010 | Chou et al. |
| 7,707,303 B2 | 4/2010 | Albers |
| 7,711,938 B2 | 5/2010 | Wise |
| 7,747,921 B2 | 6/2010 | DaCosta |
| 7,751,324 B2 | 7/2010 | Vadakital et al. |
| 7,801,146 B2 | 9/2010 | Aramaki et al. |
| 7,870,590 B2 | 1/2011 | Jagadeesan et al. |
| 7,877,660 B2 | 1/2011 | VerSteeg |
| 7,886,073 B2 | 2/2011 | Gahm |
| 7,889,654 B2 | 2/2011 | Ramakrishnan et al. |
| 7,921,347 B2 | 4/2011 | Kim et al. |
| 7,937,531 B2 | 5/2011 | Mitra |
| 7,940,644 B2 | 5/2011 | Oran |
| 7,940,777 B2 | 5/2011 | Asati |
| 7,965,771 B2 | 6/2011 | Wu |
| 8,031,701 B2 | 10/2011 | Oran |
| 8,218,654 B2 | 7/2012 | Cheng |
| 8,245,264 B2 | 8/2012 | Toebes |
| 8,462,847 B2 | 6/2013 | Wu et al. |
| 8,588,077 B2 | 11/2013 | Oran |
| 8,711,854 B2 | 4/2014 | Oran et al. |
| 2001/0000540 A1 | 4/2001 | Cooper et al. |
| 2002/0004841 A1 | 1/2002 | Sawatari |
| 2002/0006137 A1 | 1/2002 | Rabenko et al. |
| 2002/0010938 A1 | 1/2002 | Zhang et al. |
| 2002/0087976 A1 | 7/2002 | Kaplan et al. |
| 2002/0114332 A1 | 8/2002 | Apostolopoulos et al. |
| 2002/0126711 A1 | 9/2002 | Robinett et al. |
| 2002/0163918 A1 | 11/2002 | Cline |
| 2003/0025786 A1 | 2/2003 | Norsworthy |
| 2003/0025832 A1 | 2/2003 | Swart et al. |
| 2003/0076850 A1 | 4/2003 | Jason, Jr. |
| 2003/0101408 A1 | 5/2003 | Martinian et al. |
| 2003/0158899 A1 | 8/2003 | Hughes |
| 2003/0198195 A1 | 10/2003 | Li |
| 2003/0231863 A1 | 12/2003 | Eerenberg et al. |
| 2003/0236903 A1 | 12/2003 | Piotrowski |
| 2004/0057449 A1 | 3/2004 | Black |
| 2004/0071128 A1 | 4/2004 | Jang et al. |
| 2004/0078624 A1 | 4/2004 | Maxemchuk et al. |
| 2004/0100937 A1 | 5/2004 | Chen |
| 2004/0114576 A1 | 6/2004 | Itoh et al. |
| 2004/0143672 A1 | 7/2004 | Padmanabham et al. |
| 2004/0165527 A1 | 8/2004 | Gu et al. |
| 2004/0165710 A1 | 8/2004 | DelHoyo et al. |
| 2004/0196849 A1 | 10/2004 | Aksu et al. |
| 2004/0199659 A1 | 10/2004 | Ishikawa et al. |
| 2004/0213152 A1 | 10/2004 | Matuoka et al. |
| 2004/0244058 A1 | 12/2004 | Carlucci et al. |
| 2004/0255328 A1 | 12/2004 | Baldwin et al. |
| 2005/0058131 A1 | 3/2005 | Samuels et al. |
| 2005/0069102 A1 | 3/2005 | Chang |
| 2005/0074007 A1 | 4/2005 | Samuels et al. |
| 2005/0078171 A1 | 4/2005 | Firestone et al. |
| 2005/0078698 A1 | 4/2005 | Araya et al. |
| 2005/0081244 A1 | 4/2005 | Barrett et al. |
| 2005/0099499 A1 | 5/2005 | Braunstein |
| 2005/0138372 A1 | 6/2005 | Kajihara et al. |
| 2005/0169174 A1 | 8/2005 | Apostolopoulos et al. |
| 2005/0198367 A1 | 9/2005 | Ettikan |
| 2005/0204242 A1 | 9/2005 | Chou et al. |
| 2005/0207406 A1 | 9/2005 | Reme |
| 2005/0226325 A1 | 10/2005 | Dei et al. |
| 2005/0244137 A1 | 11/2005 | Takashima et al. |
| 2005/0249231 A1 | 11/2005 | Khan |
| 2005/0259803 A1 | 11/2005 | Khartabil |
| 2005/0265346 A1 | 12/2005 | Ho et al. |
| 2005/0289623 A1 | 12/2005 | Midani et al. |
| 2006/0020995 A1 | 1/2006 | Opie et al. |

(56) References Cited

U.S. PATENT DOCUMENTS

| | | |
|---|---|---|
| 2006/0048193 A1 | 3/2006 | Jacobs et al. |
| 2006/0072596 A1 | 4/2006 | Spilo et al. |
| 2006/0075084 A1 | 4/2006 | Lyon |
| 2006/0075443 A1* | 4/2006 | Eckert ............... 725/97 |
| 2006/0083263 A1 | 4/2006 | Jagadeesan et al. |
| 2006/0085551 A1 | 4/2006 | Xie et al. |
| 2006/0104458 A1 | 5/2006 | Kenoyer |
| 2006/0120378 A1 | 6/2006 | Usuki et al. |
| 2006/0126667 A1* | 6/2006 | Smith et al. ............ 370/486 |
| 2006/0143669 A1 | 6/2006 | Cohen |
| 2006/0159093 A1 | 7/2006 | Joo et al. |
| 2006/0187914 A1 | 8/2006 | Gumaste et al. |
| 2006/0188025 A1 | 8/2006 | Hannuksela |
| 2006/0189337 A1 | 8/2006 | Farrill et al. |
| 2006/0200842 A1* | 9/2006 | Chapman et al. ........... 725/34 |
| 2006/0242240 A1 | 10/2006 | Parker et al. |
| 2006/0242669 A1 | 10/2006 | Wogsberg |
| 2006/0259755 A1 | 11/2006 | Kenoyer |
| 2006/0279437 A1 | 12/2006 | Luby |
| 2007/0008934 A1 | 1/2007 | Balasubramanian et al. |
| 2007/0009235 A1* | 1/2007 | Walters et al. ............ 386/112 |
| 2007/0044130 A1 | 2/2007 | Skoog |
| 2007/0076703 A1 | 4/2007 | Yoneda et al. |
| 2007/0098079 A1 | 5/2007 | Boyce et al. |
| 2007/0110029 A1 | 5/2007 | Gilmore, II et al. |
| 2007/0123284 A1 | 5/2007 | Schliwa-Bertling et al. |
| 2007/0133435 A1 | 6/2007 | Eneroth et al. |
| 2007/0200949 A1 | 8/2007 | Walker et al. |
| 2007/0204320 A1 | 8/2007 | Wu et al. |
| 2007/0214490 A1 | 9/2007 | Cheng et al. |
| 2007/0268899 A1 | 11/2007 | Cankaya |
| 2007/0277219 A1 | 11/2007 | Toebes et al. |
| 2007/0292107 A1 | 12/2007 | Yahata et al. |
| 2008/0022340 A1 | 1/2008 | Hannuksela et al. |
| 2008/0062990 A1 | 3/2008 | Oran |
| 2008/0189489 A1 | 8/2008 | Mitra |
| 2008/0225850 A1 | 9/2008 | Oran |
| 2008/0253369 A1 | 10/2008 | Oran |
| 2008/0256409 A1 | 10/2008 | Oran et al. |
| 2008/0267078 A1 | 10/2008 | Farinacci |
| 2008/0310435 A1 | 12/2008 | Cagenius et al. |
| 2009/0034627 A1 | 2/2009 | Rodriguez |
| 2009/0034633 A1 | 2/2009 | Rodirguez |
| 2009/0049361 A1 | 2/2009 | Koren et al. |
| 2009/0055540 A1 | 2/2009 | Foti et al. |
| 2009/0119722 A1 | 5/2009 | VerSteeg |
| 2009/0150715 A1 | 6/2009 | Pickens |
| 2009/0201803 A1 | 8/2009 | Filsfils |
| 2009/0201805 A1 | 8/2009 | Begen |
| 2009/0213726 A1 | 8/2009 | Asati |
| 2009/0217318 A1 | 8/2009 | VerSteeg et al. |
| 2010/0005360 A1 | 1/2010 | Begen |
| 2010/0036962 A1 | 2/2010 | Gahm |
| 2011/0131622 A1 | 6/2011 | Wu et al. |
| 2011/0161765 A1 | 6/2011 | Oran |
| 2012/0189007 A1 | 7/2012 | Oran et al. |
| 2014/0029628 A1 | 1/2014 | Oran |

FOREIGN PATENT DOCUMENTS

| | | |
|---|---|---|
| CN | 1947399 | 4/2007 |
| EP | 1271953 | 1/2003 |
| EP | 1553735 | 7/2005 |
| EP | 1581005 | 9/2005 |
| EP | 1608116 | 12/2005 |
| EP | 1670252 | 6/2006 |
| EP | 2008728919 | 2/2008 |
| EP | 7814245.2 | 5/2009 |
| EP | 2007814246 | 6/2009 |
| EP | 8731381.3 | 11/2009 |
| EP | 2220845 | 8/2010 |
| WO | 9718637 | 5/1997 |
| WO | 0019693 | 4/2000 |
| WO | 0035201 | 6/2000 |
| WO | 2000/076113 | 12/2000 |
| WO | 2001061909 | 8/2001 |
| WO | 2005/048519 A1 | 5/2005 |
| WO | 2006031925 | 3/2006 |
| WO | 2006057606 | 6/2006 |
| WO | 2006107424 | 10/2006 |
| WO | 2008/000289 | 1/2008 |
| WO | 2008033644 | 3/2008 |
| WO | 2008033645 | 3/2008 |
| WO | 2008100725 | 8/2008 |
| WO | 2008112465 | 9/2008 |
| WO | 2009/058645 | 5/2009 |
| WO | 2009099847 | 8/2009 |

OTHER PUBLICATIONS

International Search Report for PCT/US09/032305; Date of mailing Oct. 5, 2009.
Written Opinion of the International Searching Authority for PCT/US09/032305; Date of mailing Oct. 5, 2009.
International Search Report for PCT/US08/55837; Date of mailing Jul. 3, 2008.
Written Opinion of the International Searching Authority for PCT/US08/55837; Date of mailing Jul. 3, 2008.
Written Opinion of the International Searching Authority for PCT/US08/52907; Mailing Date Jul. 7, 2008.
Written Opinion of the International Searching Authority for PCT/US07/76264; Mailing date Jul. 7, 2008.
International Search Report for PCT/US07/76265 ; Mailing date Aug. 20, 2008.
Written Opinion of the International Searching Authority for PCT-US07-76265; Aug. 20, 2008.
Degalahal, et al., Analyzing Soft Errors in Leakage Optimized SRAM Design, Article, Jan. 2003, pp. 1-7, 16th International Conference on VLSI Design.
Zhang, Computing Cache Vulnerablity to Ransietn Errors and It's Implication, Article, Oct. 2005, pp. 1-9, IEEE Computer Society.
Weaver, et al. Reducing the Soft-Error Rate of a High-Performance Microprocessor, Article, 2004, pp. 30-37, IEEE Computer Society.
Li, et al., Soft Error and Energy Consumption Interactions: A Data Cache Perspective, Article, Aug. 9, 2004, pp. 1-6, ISLPED '04.
Stolowitz Ford Cowger LLP, Listing of related cases Mar. 3, 2010.
Supplementary European Search Report for EP08731381, Mar. 26, 2010, 7 pages.
Rey et al., "RTP Retransmission Payload Format—RFC 4588", Jul. 1, 2006, 29 pages.
Duffy, "Riverstone Recasts Multicast Video", 2 pages, Aug. 5, 2002, Network World Inc., www.networkworld.com/edge/news/2002/0805edge.html.
Lehman et al., Active Reliable Multicast (ARM), 1998, IEEE, pp. 581-589.
Liang et al., Feedback suppression in reliable multicast protocol, 2000. IEEE, pp. 1436-1439.
Adamson et al., Negative-Acknowledgment (NACK)-Oriented Reliable Multicast (NORM) Building Blocks (RFC 3941), Nov. 2004, RFC 3941 (IETF, Org), pp. 1-37.
U.S. Appl. No. 11/736,463, filed Apr. 17, 2007—Prosecution History.
U.S. Appl. No. 11/735,930, filed Apr. 16, 2007—Prosecution History.
U.S. Appl. No. 11/561,237, filed Nov. 17, 2006—Prosecution History.
United States PCT Office, International Search Report, Jul. 7, 2008, 3 pgs.
Rosenberg, J., et al., "Registration of parityfec MME types", RFC 3009, Nov. 2000, 11 pgs.
Luby, M., et al., "Forward Error Correction (FEC) Building Block", RFC 3452, Dec. 2002, 16 pages.
Schulzrinne, H., "RTP: A Transport Protocol for Real-Time Applications", RFC 3550, Jul. 2003, 89 pages.
Luby, M., et al., "Compact Forward Error Correction (FEC) Schemes", RFC 3695, Feb. 2004, 14 pages.

(56) References Cited

OTHER PUBLICATIONS

Ott, J., et al., "Extended RTP Profile for RTCP-based Feedback (RTP/AVPF)", draft-ietf-avt-rtcp-feedback-11, Aug. 10, 2004, 52 pages.
Watson, M., "Basic Forward Error Correction (FEC) Schemes", draft-ietf-rmt-bb-fec-basic-schemes-revised-02, Mar. 3, 2006, 17 pages.
Chesterfield, J., et al., "RTCP Extensions for Single-Source Multicast Sessions", draft-ietf-avt-rtcpssm-11, Mar. 6, 2006, 67 pages.
Rey, J., et al., "RTP Retransmission Payload Format", RFC 4588, Jul. 2006, 24 pages.
Pendleton, et al., Session Initiation Package for Voice Quality Reporting Event, Sipping Working Group, 2006, pp. 1-24.
USPTO, PCT International Search Report, Jul. 7, 2008, 3 pgs.—Different.
Handley, M. et al., "SIP: Session Initiation Protocol", RFC 2543, Mar. 1999.
T. Friedman, "RTP Control Protocol Extended Reports (RTCP XR)", RFC 3611, Nov. 2003.
Ott, "Extended RTP Profile for RTCP-based Feedback (RTP/AVPF)" draft-ieft-av-rtcp-feedback-01-txt., Nov. 21, 2001.
Approach Inc., "Streaming Media Technical Analysis", Nov. 2000.
Turner, Jonathan S., "WDM Burst Switching" www.isoc.org/inet99/proceedings/4j/4j_3.htm, 1999.
GossamerThreads, "Channel Change Speed", www.gossamer-threads.com/lists/engine?do=post_view_flat;post=13776, Sep. 12, 2003.
Nguyen, Thinh et.al., Protocols for Distributed Video Streaming, IEEE ICIP 2002.
Byers, John W. et al., Accessing Multiple Mirror Sites in Parallel: Using Tornado Codes to Speed Up Downloads, IEEE 1999.
Cisco Systems, Cisco Visual Quality Experience: Product Overview, www.cisco.com/en/US/partner/prod/collateral/video/ps7191/ps7126/product_data_sheet0900aecd8057f446.html, 2009.
Cisco Systems, Converge IP and DWDM Layers in the Core Network, http://www.cisco.com/en/US/prod/collateral/routers/ps5763/prod_white_paper0900aecd80395e03.html, 2007.
Silver Peak Systems, Inc., "Data Center Class WAN Optimization: Latency & Loss Mitigation", www.silver-peak.com/Technology/latency_loss_mitigation.htm, 2010.
P. A. Chou and Z. Miao, "Rate-distortion optimized streaming of packetized media," Microsoft Research Technical Report MSR-TR-2001-35, Feb. 2001.
Rajamoni, Ramakrishnan, R. Bhagavathula, and R. Pendse. "Timing analysis of block replacement algorithms on disk caches." 43rd IEEE Midwest Symposium on Circuits and Systems, Proceedings, Aug. 8-11, 2000.
Lee, Jung-Hoon, J.S. Lee, and S.D. Kim. "A selective temporal and aggressive spatial cache system based on time interval." 2000 International Conference on Computer Design (IEEE), Proceedings, Sep. 17-20, 2000.
European Search Report for EP08728919; Aug. 19, 2010; 11 pgs.
Begen, Ali C., Enhancing the Multimedia Experience in Emerging Network, A Thesis Presented to the Academic Faculty; Dec. 2006; available at http://etd.gatech.edu/theses/available/etd-11062006-002415/.
Schulzrinne et al., RTP: A Transport Protocol for Real-Time Applications, Network Working Group, 2002, pp. 1-92.
Chinese First Office Action dated Aug. 3, 2010 cited in Appl. No. 200880004738.8, 16 pgs.
Chinese Second Office Action dated May 20, 2011 cited in Appl. No. 200880004738.8, 11 pgs.
Chinese First Office Action dated Jul. 4, 2011 for Appl. No. 200780022360.X, 11 pgs.
European Office Action dated Oct. 27, 2011 cited in Appl. No. 08 728 919.5 6 pgs.
Chinese Third Office Action dated Oct. 28, 2011 cited in Appl. No. 200880004738.8, 9 pgs.
Chinese Fourth Office Action dated Feb. 22, 2012 cited in Appl. No. 200880004738.8, 7 pgs.
Chinese Second Office Action dated Jul. 2, 2012 for Appl. No. 200780022360.X, 12 pgs.
U.S. Office Action dated Oct. 27, 2009 cited in U.S. Appl. No. 12/101,796, 45 pgs.
U.S. Office Action dated Jul. 26, 2010 cited in U.S. Appl. No. 12/101,796, 41 pgs.
U.S. Final Office Action dated Feb. 17, 2011 cited in U.S. Appl. No. 12/101,796, 36 pgs.
U.S. Office Action dated Sep. 27, 2011 cited in U.S. Appl. No. 12/168,772, 17 pgs. (not M&G case).
U.S. Final Office Action dated Jan. 10, 2012 cited in U.S. Appl. No. 12/168,772, 15 pgs. (not M&G case).
U.S. Office Action dated Oct. 24, 2012 cited in U.S. Appl. No. 13/435,431, 25 pgs.
U.S. Office Action dated Oct. 31, 2012 cited in U.S. Appl. No. 13/043,437, 37 pgs.
U.S. Final Office Action dated Apr. 11, 2013 cited in U.S. Appl. No. 13/043,437, 11 pgs.
U.S. Final Office Action dated Apr. 16, 2013 cited in U.S. Appl. No. 13/435,431, 18 pgs.
International Search Report for PCT/US08/80882 dated Mar. 30, 2009, 3 pgs.
International Preliminary Report on Patentability (1 pg.) and Written Opinion of the International Search Authority (6 pgs.) for PCT/US08/80882 dated May 4, 2010.
European Search Report dated Mar. 7, 2013 cited in Appl. No. 07814246.0, 9 pgs.
Chinese Fourth Office Action dated Mar. 25, 2013 cited in Appl. No. 200780022360.X, 7 pgs.
Brassil, Jack, et al., "Structuring Internet Media Streams with Cueing Protocols," IEEE/ACM Transactions on Networking, IEEE/ACM New York, NY, vol. 10, No. 4, Aug. 2002, XP011077174.
Castro H., et al., "Monitoring Emerging IPv6 Wireless Access Networks," IEEE Wireless Communications, IEEE Service Center, Piscataway, NJ, vol. 12, No. 1, Feb. 2005, XP011127719.
Wonyong Yoon et al., "A Combined Group/Tree Approach for Scalable Many-to-many Reliable Multicast," Proceedings IEEE Infocom., vol. 3, Jun. 23, 2002, pp. 1336-1345.
Victor O.K. Li et al., "Internet Multicast Routing and Transport Control Protocols," Proceedings of IEEE, vol. 90, No. 3, Mar. 1, 2002, pp. 360-391.
Hrishikesh Gossain et al., "Multicast: Wired to Wireless," IEEE Communications Magazine, IEEE Service Center, vol. 40, No. 6, Jun. 1, 2002, pp. 116-123.
A. Erramilli et al., "A Performance Analysis of Protocols for Multicast Communication in Broadband Packet Networks," XP010077385, Jun. 13, 1988, pp. 222-226.
Chinese Third Office Action dated Dec. 3, 2012 cited in Appl. No. 200780022360.X, 8 pgs.
U.S. Office Action dated Jan. 2, 2013 cited in U.S. Appl. No. 13/016,773, 36 pgs.
U.S. Office Action dated Apr. 9, 2013 cited in U.S. Appl. No. 11/831,906, 22 pgs.
U.S. Office Action (Ex Parte Quayle) dated Sep. 20, 2013 cited in U.S. Appl. No. 13/435,431, 7 pgs.
Copending U.S. Appl. No. 14/045,813, filed Oct. 4, 2013 entitled "Retransmission-Based Stream Repair and Stream Join".
U.S. Final Office Action dated Nov. 13, 2013 cited in U.S. Appl. No. 11/831,906, 32 pgs.
U.S. Final Office Action dated Dec. 9, 2013 cited in U.S. Appl. No. 12/168,772, 16 pgs.
U.S. Final Office Action mailed Mar. 21, 2014 cited in U.S. Appl. No. 12/168,772, 16 pgs.

\* cited by examiner

FAST CHANNEL CHANGE ON A BANDWIDTH CONSTRAINED NETWORK

TECHNICAL FIELD

The present disclosure relates generally to the field of networking.

BACKGROUND

A network device receiving a video stream that is encoded using an inter-coded compression technique generally experiences a delay between the time of joining the video stream and the time a displayable video frame can be locally reconstructed. This delay results from the fact that the inter-coded frames (for example P and B frames in the case of Motion Pictures Experts Group 2 (MPEG-2) encoding) cannot be used to reconstruct a displayable video frame until the first intra-coded frame (for example an I frame in the case of MPEG-2 encoding) has been received.

Accordingly, when a set-top box joins an inter-coded video stream in response to a user requesting a channel change or powering on the set-top box, the set-top box begins receiving compressed frame data. The set-top box must then wait to reconstruct a displayable video frame until the first intra-coded frame is available. Partial solutions to this reconstruction delay exist, but these solutions generally require a great deal of bandwidth availability on the entire network path extending from the source of the video stream to the set-top box. The disclosure that follows solves this and other problems.

DESCRIPTION OF EXAMPLE EMBODIMENTS

Overview

Figure 1:
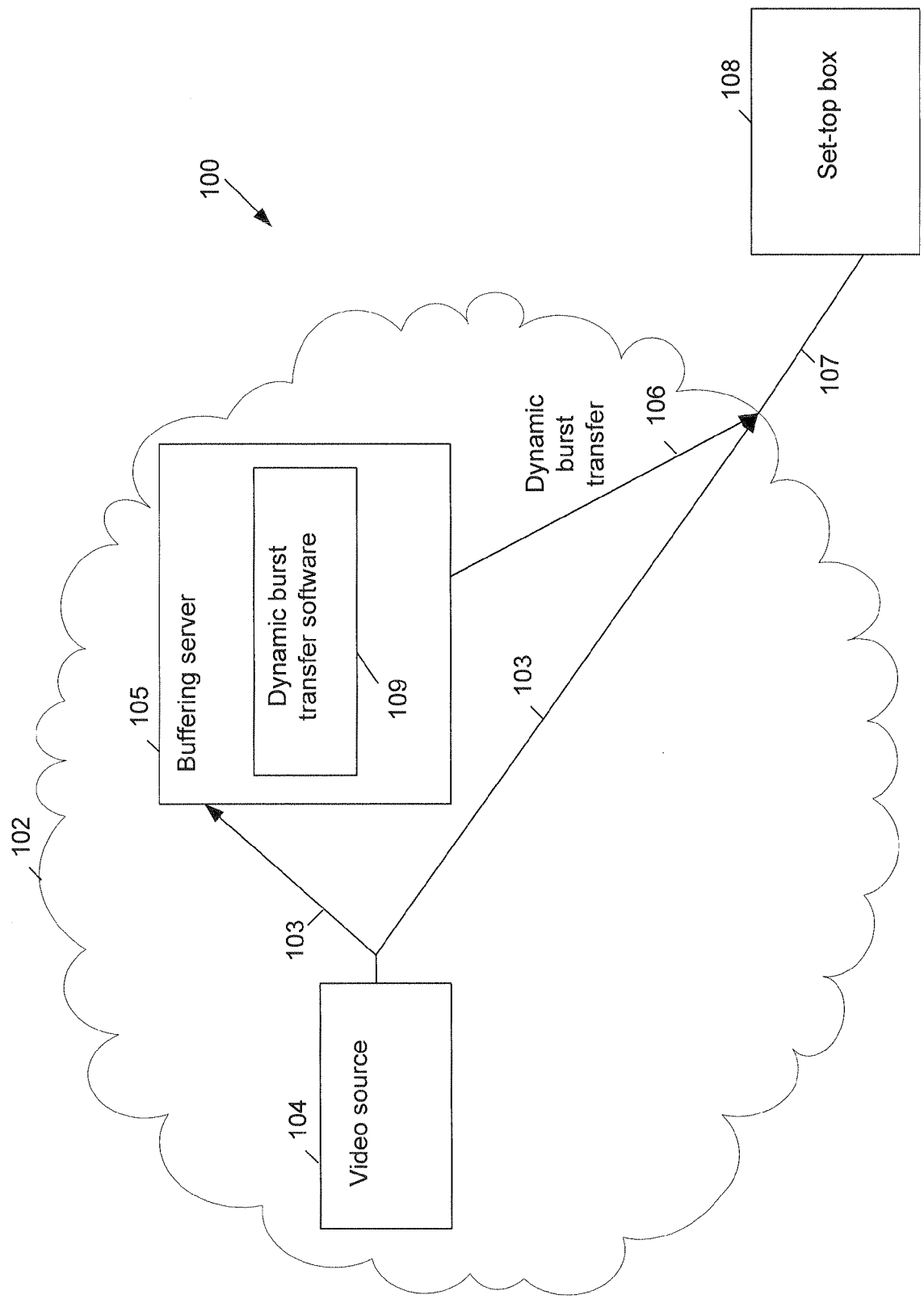
FIG. 1 illustrates an example system for allowing a decoding endpoint to quickly output a displayable video frame upon joining a video stream.

In one embodiment, a buffering server transfers a dynamic burst transfer of data encoded using an inter-coded compression technique. The dynamic burst transfer is timed so that an initial transfer rate is reduced to a remaining transfer rate at the same time or before a decoding endpoint joins a corresponding data stream. The decoding endpoint merges the video stream and the dynamic burst transfer to decode and quickly reconstruct a displayable video frame.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates an example system for allowing a decoding endpoint to quickly output a displayable video frame upon joining a video stream.

Referring to FIG. 1, the system 100 includes a network 102 that provides video content to a decoding endpoint such as a set-top box 108 or other network device over a link 107 such as a Digital Subscriber Line (DSL). The video source 104 multicasts a video stream 103 or other data stream to a plurality of decoding endpoints, e.g. thousands of decoding endpoints (not shown), coupled to the network 102. The video stream 103 includes packets or other data having sequence numbers usable by the endpoints to place the received data into its original order and to suppress duplicates. Each of the plurality of endpoints including the set-top box 108 joins the video stream 103 by sending a join request. Joining the video stream 103 may occur responsively to a user changing a channel or turning on the set-top box 108.

The set-top box 108 sends a request for a burst transfer to a buffering server 105 that receives and stores the video stream 103. The buffering server 105 includes software 109 for transferring back to the requesting set-top box 108 a dynamic burst transfer 106 containing data originating from the video stream 103 that is also received on the buffering server 105. The dynamic burst transfer 106 is configured by the software 109 to allow the set-top box 108 to reconstruct a displayable frame with minimal delay while allowing the set-top box 108 to merge the dynamic burst transfer 106 with the video stream 103 after the set-top box 108 has joined the stream.

The dynamic burst transfer 106 begins at the start of an intra-coded frame, usable by the set-top box 108 to quickly reconstruct a displayable frame upon joining the video stream 103 sent from the video source 104. The amount of bandwidth used by the dynamic burst transfer 106 varies over time to prevent over-saturation of the link 107 due to the extra bandwidth of the burst, and when the video stream 103 is received in parallel over the same link 107. Accordingly, the set-top box 108 is able to quickly output a continuous sequence of frames starting with a complete intra-coded frame received when joining the video stream 103.

In the present example the video source 104 and buffering server 105 are shown as separate devices; however, in other examples a single device may provide both the video stream 103 and the dynamic burst transfer 106. Although the present example shows the set-top box 108 for receiving the video stream, other examples include any network device receiving any type of data stream that is encoded using inter-coding or any similar technique that uses earlier transferred frames to reconstruct a displayable frame.

Figure 2:
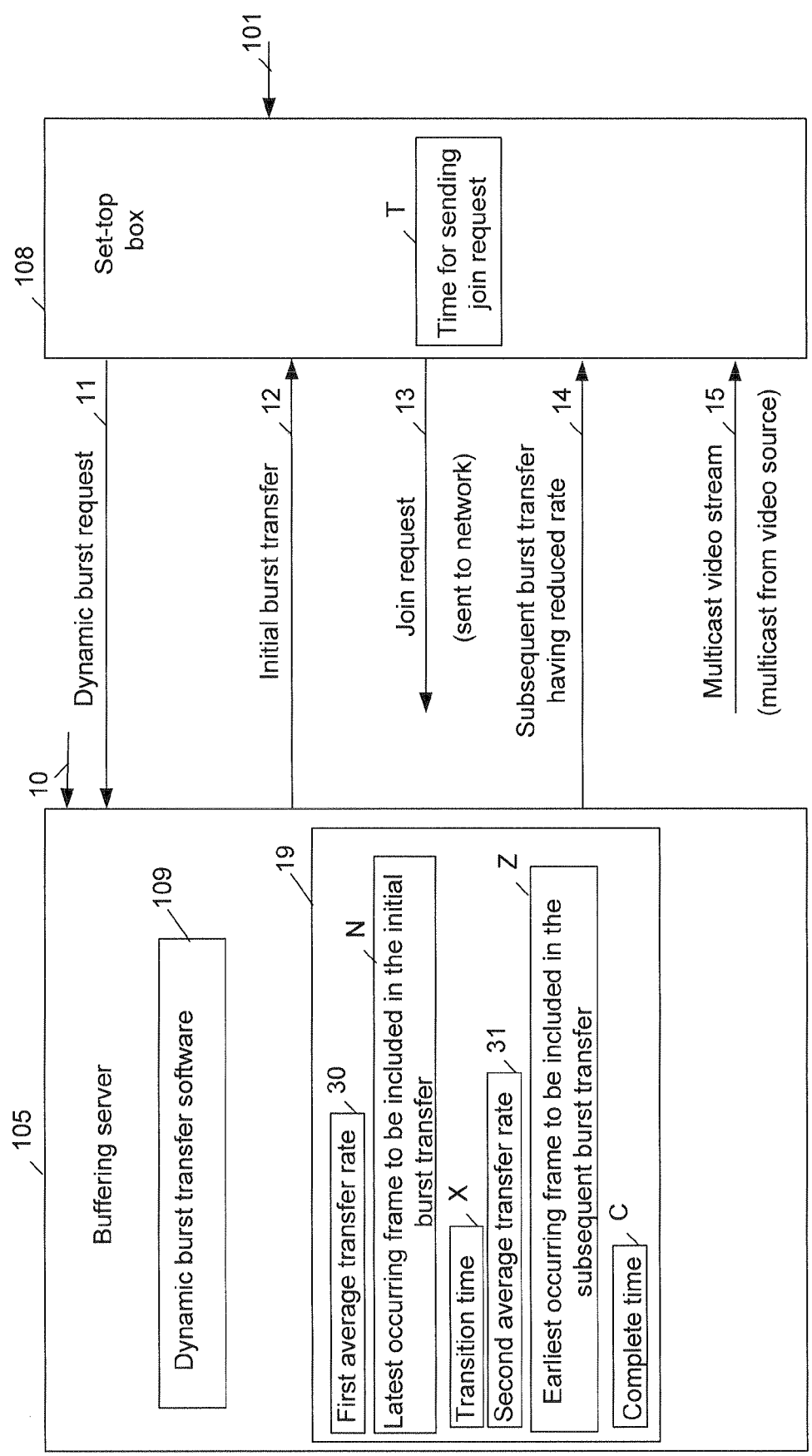
FIG. 2 illustrates an example of the buffering server illustrated in FIG. 1.

FIG. 2 illustrates an example of the buffering server illustrated in FIG. 1.

The set-top box 108 receives a request 101 to join a video stream, which may occur when a user changes a channel or turns on the set-top box 108. In response to receiving the request 101 to join the video stream, the set-top box 108 sends a dynamic burst request 11 to the buffering server 105 that buffers the video stream.

The dynamic burst request 11 is received by the buffering server 105, which in the present example receives the corresponding video stream from a separate device (in other examples the functions of the buffering server 105 may be integrated into a device that also originates the video stream). The software 109 generates parameters 19 for a dynamic burst transfer based on characteristics of both the video stream and a link, such as a DSL link, connecting the set-top box 108 to the network.

The first average burst transfer rate 30 represents a transfer rate for sending an initial burst transfer 12. The parameters 19 also include a sequence number N of a latest occurring packet or other segment of information to be included in the initial burst transfer 12 and the transition instant X for starting a reduced rate burst transfer 14. The second average burst transfer rate 31 represents a reduced transfer rate for sending the burst transfer 14, and the parameters 19 also include the sequence number Z for the latest occurring packet to be included in the reduced rate burst transfer 14.

As stated previously, the software 109 uses the characteristics of both the DSL link and the video stream to generate the parameters 19 for sending the initial burst transfer 12 and the reduced rate burst transfer 14. The characteristics of the DSL link and the video stream may be automatically observed by the server 105 or manually provided using the input 10. The method used by the software 109 for generating the parameters 19 is discussed in greater detail with respect to FIG. 3, and as will be shown in FIG. 3 preferably takes into account other variables besides the characteristics of the DSL link and the video stream.

Still referring to FIG. 2, the set-top box 108 receives back the initial burst transfer 12 sent in response to the dynamic burst request 11. The first average transfer rate 30 is selected to consume more than an amount of bandwidth used for the rate of the video stream and less than the entire bandwidth available on the DSL link. In the present example, the first average transfer rate 30 consumes a constant amount of bandwidth, but in other examples the actual transfer rate may not be strictly constant provided that the average rate over this interval is at least the rate of the video stream and does not exceed the rate of the link.

The set-top box 108 sends a join request 13 to the network for joining the video stream. The join request 13 is sent at time T, which is preferably calculated based on the characteristics of the link and the video stream and may be calculated by the buffering server 105 or any other network device. The preferred method for calculating the time T is described in greater detail with respect to FIG. 3. In the present example, the calculated time T is provided to the set-top box 108 for coordinating the sending of the join request 13 with the rate reduction of the burst and the later cessation of the burst.

Still referring to FIG. 2, at the same time or shortly after the sending of the join request 13, the initial burst transfer 12 ends with sequence number N and a reduced rate burst transfer 14 using the second average transfer rate 31 is received. In other words, the transition instant X for the rate change is occurs no later than the earliest time at which the join request 13 could cause data from the video stream to begin to appear on the link. This feature avoids over-saturating the link. The reduced rate burst transfer 14 continues to supply the intra-coded frame and other data, except at a rate low enough to avoid saturating the link if the video stream packets arrive a bit too soon. The second average transfer rate 31 is selected such that, when combined with the rate of the video stream, less than the entire bandwidth of the DSL link is consumed. The preferred method for selecting the second average transfer rate 31 to prevent over-saturation and under-run is discussed in greater detail with reference to FIG. 3.

Still referring to FIG. 2, the set-top box 108 subsequently joins the multicast video stream 15. The video stream and the reduced rate burst transfer 14 together consume no more than all the bandwidth available on the link and therefore data loss is prevented. At this join time, the set-top box 108 has been provided with a complete intra-coded frame and thus is able to reconstruct a displayable frame by merging burst-transferred data with the data included in the video stream. In other words, the set-top box 108 does not experience a delay caused by waiting to receive the first intra-coded frame on the video stream.

Figure 3:
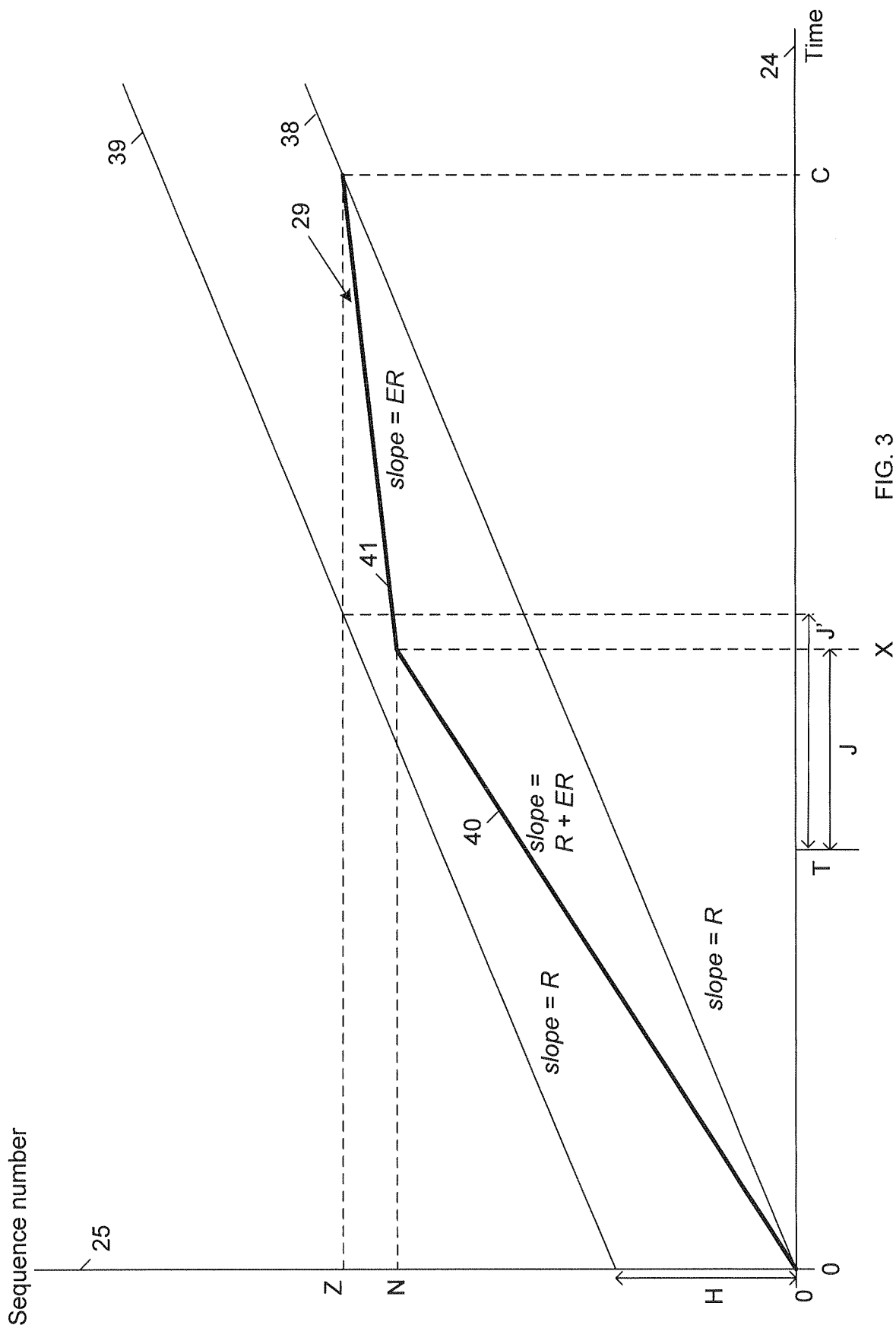
FIG. 3 illustrates an example of the dynamic burst transfer sent by the buffering server in FIG. 2.

FIG. 3 illustrates an example of the dynamic burst transfer sent by the buffering server in FIG. 2.

Referring to FIG. 3, a dynamic burst transfer 29 is shown with respect to a time axis 24 and a sequence number axis 25. Also shown is the line 38 representing an upper bound of the sequence numbers being processed by the decoder at the set-top box as a function of time, which is an amount H of sequence numbers behind the video stream rate 39. The first period 40 occurs when the initial burst transfer 12 (FIG. 2) is used to burst transfer packets of these sequence numbers faster than they are decoded by the set-top box. The second period 41 occurs while the reduced rate burst transfer 14 (FIG. 2) is used to burst transfer packets of these sequence numbers more slowly than the decode rate. The rate of the burst transfer 29 is reduced at the transition instant X. At the transition instant X, the sequence number N is the latest occurring sequence number received at set-top box.

The video stream is transferred at a rate R, which is reflected by the slope of the video stream rate 39 and the slope of the decoding output rate 38. During the first period 40, the first average transfer rate 30 (FIG. 2) of the dynamic burst transfer 29 is preferably selected to consume more than an amount of bandwidth used for the rate R and less than the entire bandwidth available on the link, which is equal to the sum of the rate R and the product of the rate R and a fractional amount of excess bandwidth E. The second average transfer rate 31 (FIG. 2) is preferably selected to consume no greater than the product of the rate R and the fractional amount of excess bandwidth E.

At all times between time zero and time C, the distance between lines 38 and 29 corresponds to the amount, in sequence numbers, of packets or other data stored in a buffer on the set-top box 108. As shown in the graph, during the first period 40 the amount of packets stored in the buffer increases. Conversely, during the second period 41 the buffer starts to empty. The packets in the buffer are completely consumed when the burst transfer 29 completes.

The time T for sending the join request depends on a delay range representing time passing between the time T and the actual time that the set-top box joins the video stream. The minimum response time is an amount J. To account for a very responsive network, J may be set to zero. The maximum join response time is an amount J'. Both the amounts J and J' should also be considered when calculating the time T for sending the join request to prevent under-runs and output gaps from occurring when the burst transfer 29 completes.

When the actual join time does not occur until the latest time T+J', the video stream only provides packets or other data segments having sequence numbers greater than Z. Therefore, sequence numbers N through Z should be provided by the burst transfer. The graph shows that the duration and rate of the burst transfer 29 is selected such that the latest occurring sequence number transferred using the burst transfer is sequence number Z. In other words, at time C, the set-top box has consumed all of the cache and seamlessly starts decoding the video stream. No pause attributable to waiting for the first intra-coded frame is required; this data has been received by the time the set-top box joins the stream.

Several properties can be extracted from the above description and FIG. 3. The first period 40 of the burst transfer 29 is set at a rate greater than R, but less than (1+E)R. The second period 41 of the burst transfer 29 is set at a rate no greater than ER at a time occurring no later than time T plus the amount J. The time T for sending the join request is chosen so that the set-top box accumulates a buffer backlog sufficient to prevent under-run even when the video stream is not actually received until the time T plus J'.

An equation for determining the time T for sending the join request is shown below:

$$T = \frac{(1-E)}{E}J' - \frac{J}{E} + \frac{H(1-E)}{RE}$$

The calculated time T for sending the join request is dependent on network parameters. For example, the amount J is the minimum amount of time passing between sending the join request and actually joining the video stream and is dependent on network/server responsiveness. The amount J' is the maximum delay time and may also be related to network/server responsiveness.

The time T for sending the join request also depends on the characteristics of the video stream and the link used to transfer the stream. For example, the rate R is the transfer rate used for the video stream. The fraction E is a fraction amount of excess bandwidth available on the link after accommodation for the rate R of the video stream. For example, when the link is capable of transmitting one hundred and twenty percent and the bandwidth used by the rate R, then E is equal to 0.2 When the link is capable of 2*R, then E is equal to 1. The amount H is a sequence number difference between the video stream and a position of a preceding start of an intra-coded frame.

Example equations are also provided for configuring the shape and content of the preferred burst transfer. These following equations are preferably used by the buffering server for determining parameters of the burst transfer. One equation shows a method for identifying the time C (which also indicates burst transfer duration), the time for completing the burst transfer:

$$C = \frac{(J'-J)R+H}{ER}$$

Another equation shows a preferable method for determining the latest occurring sequence number N to be transferred using the first average transfer rate:

$$N = \frac{(1+E)(1-E)}{E}R\left(J'-J+\frac{H}{R}\right)$$

And yet another equation shows a preferable method for determining the latest occurring sequence number Z transferred using the second average transfer rate:

$$Z = \frac{(J'-J)R+H}{E}$$

The calculation of T and the determination of other characteristics of the burst transfer may be performed by the set-top box, the buffering server or any other entity provided with the necessary inputs. Embodiments of the invention are not limited to where these calculations are performed or how the results of the calculations are distributed to the set-top box and the buffering server. Furthermore, in some applications the knowledge of H, J, J', E and R may be distributed and not known to the entity that is to perform the calculation of T and the characteristics of the burst transfer. Both the transferring of the input parameters to the entity performing the calculations and the distribution of the results to the set-top box and the buffering server can be accomplished using an appropriate protocol.

Although the above examples are described wherein the buffering server receives the video stream and then re-sends already transmitted data, the methods described above work equally well when the buffering server provides data not yet transmitted on the video stream. In other words, the burst transfer may include either "past" data or "future" data with respect to what data is included on the multicast video stream at any given time. The future data is typically sent when the buffering server is the same device that originates the data stream.

Figure 4:
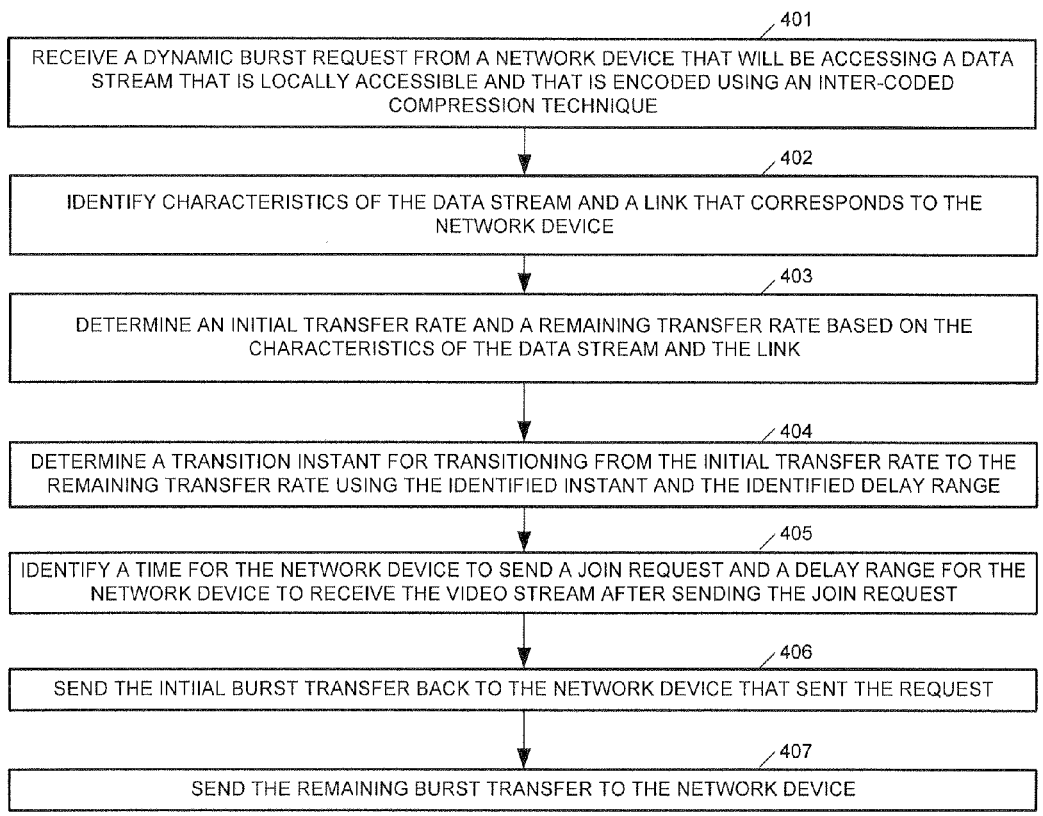
FIG. 4 illustrates an example method for using the buffering server illustrated in FIG. 2.

FIG. 4 illustrates an example method for using the buffering server illustrated in FIG. 2.

In block 401, the buffering server 105 receives a dynamic burst request from a network device that will be accessing a data stream that is encoded using an inter-coded compression technique or other compression technique that involves using historical data during decoding. The buffering server observes or identifies characteristics of the data stream to be accessed and a link that corresponds to the network device in block 402.

In block 403, the buffering server 105 uses the characteristics of the data stream and the link to determine an initial transfer rate and a remaining transfer rate. In block 404, the buffering server 105 identifies a transition instant for transitioning from the initial transfer rate to the remaining transfer rate. In block 405, the buffering server identifies a time for the network device to send a join request (which is provided to the network device), which is in part based on a delay range for receiving the video steam after sending the join request.

In block 406, the buffering server 105 sends an initial burst transfer back to the network device that sent the request. In block 407, at the transition time the buffering server 105 begins sending the remaining burst transfer to the network device. The network device is thus able to merge the received video stream with the burst-transferred data to quickly decode and reconstruct displayable frames without a delay caused by waiting for an intra-coded frame.

The above methods for facilitating frame reconstruction without a delay caused by waiting for an intra-coded frame can be used in conjunction with the repair schemes for "fast stream join" disclosed in patent application Ser. No. 11/561, 237, which is herein incorporated by reference.

For ease of illustration, the above examples describe data that is transferred in order based on sequence numbers or other reordering indications. However, data need not actually be sent in order. For example, when the latest occurring data to be transmitted using a burst transfer contains sequence number Z, this data may actually be transmitted before other data having earlier occurring sequence numbers. Such a transmission may have certain optimizations over an in-order transmission. Regardless, the above methods are equally usable with both systems that transfer data out of order and systems that transfer data in order.

The above examples are described for cases where the video stream is being sent at a constant rate, reflected as a constant rate of increase of sequence numbers as a function of time. In other examples, the video stream may not be sent at a constant rate. In these cases, equations different from the above example equations may be used to calculate the first average transfer rate, the second average transfer rate and the transition time. Also, in these other examples in which the video stream is not being sent at a constant rate, the actual transfer rate during the first transfer period and the second transfer period might not be constant, but might instead vary of the first and second transfer intervals.

The above examples function best in networks having negligible and constant transfer delays. *The assumption of zero transfer delay is made for ease of explanation. Network jitter and other network anomalies may require adaptations to the above described formulas and methods. For example, high jitter may be compensated by intentionally overestimating J', or determining the transition instant X and then causing an actual transition instant to occur slightly later. Other such adaptations may be made to the above equations and methods, as would be recognized by one of ordinary skill in the art.

The above examples are described with respect to a set-top box decoding a video stream. In other examples, the methods described above may applied to another network device decoding a video stream such as a High Definition TeleVision (HDTV) decoder, a personal computer, an IP phone, a Personal Digital Assistant (PDA), a cell phone, a smart phone, etc.

Several preferred examples have been described above with reference to the accompanying drawings. Various other examples of the invention are also possible and practical. The system may be exemplified in many different forms and should not be construed as being limited to the examples set forth above.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method, comprising:
    transmitting a burst transfer to a remote endpoint, the burst transfer including data packets extracted from a video stream;
    wherein the burst transfer is a continuous data stream that includes an initial portion at an initial transfer rate ((1+E)R) and a subsequent portion at a reduced subsequent transfer rate (ER), wherein R is a transfer rate of the video stream and E is a fraction amount of excess bandwidth;
    wherein transmission of the subsequent portion of the burst transfer begins at the transition instant and continues through a time that the remote endpoint actually joins the video stream;
    wherein the burst transfer begins at an intra-coded frame;
    wherein the initial portion includes the data packets from the intra-coded frame to a first latest occurring data packet (N);
    wherein the subsequent portion includes the data packets from the first latest occurring data packet (N) to a second latest occurring data packet (Z), wherein the second latest occurring data packet is determined as:

$$Z = \frac{(\Delta J)R + H}{E},$$

wherein H is a sequence number difference between the video stream and a position of a preceding start of the intra-coded frame, and wherein $\Delta J$ is a join latency.

2. The method of claim 1, further comprising:
    identifying a bandwidth capability of a link used to transmit the burst transfer to the remote endpoint;
    identifying a transfer rate of the video stream; and
    selecting the initial transfer rate based on the bandwidth capability of the link and the transfer rate of the video stream.

3. The method of claim 1, further comprising:
    determining a request time for the remote endpoint to transmit a request to join the video stream; and
    transmitting a message to the remote endpoint to identify the determined request time to the remote endpoint and for causing the remote endpoint to transmit the request for receiving the video stream at the determined request time.

4. The method of claim 3, wherein the request time is determined based on a bandwidth capability of a link used to transmit the burst transfer to the remote endpoint and a transfer rate of the video stream.

5. The method of claim 4, further comprising:
    identifying data containing a latest occurring sequence number for transfer using the burst transfer; and
    determining a duration of the burst transfer, the duration based on a time delay range for the remote endpoint to receive the video stream after transmitting the request to join the video stream.

6. The method of claim 5, wherein the data having the latest occurring sequence number is transmitted before other burst-transferred data having earlier occurring sequence numbers.

7. The method of claim 1, wherein the transition instant is selected to occur no later than a time that the remote endpoint joins the video stream after transmitting a request to join the video stream.

8. The method of claim 1, wherein the video stream is transferred from a same transmitting source of the burst transfer to the remote endpoint.

9. The method of claim 1, wherein the video stream is encoded using Motion Pictures Experts Group (MPEG) encoding and the burst transfer includes I frame information for combining with other information transferred to the remote endpoint using the video stream.

10. The method of claim 1, further comprising:
    identifying a sequence number difference between the video stream and a position of a preceding start of an intra-coded frame; and determining a time for completing the reduced subsequent transfer rate based on the sequence number difference.

11. An apparatus, comprising:
a processor; and
a memory coupled to the processor comprising instructions executable by the processor, the processor operable when executing the instructions to:
send a dynamic burst request to a remote network device as a single data stream;
send a join request to join a video stream;
receive an initial portion of a dynamic burst transfer at a first average transfer rate ((1+E)R) and then transitions to receive a subsequent portion at a second average transfer rate (ER) at a predetermined transition time, wherein R is a transfer rate of the video stream and E is a fraction amount of excess bandwidth;
wherein the burst transfer begins at a start of an intra-coded frame;
wherein the initial portion includes data packets from the intra-coded frame to a first latest occurring data packet (N);
wherein the subsequent portion includes the data packets from the first latest occurring data packet (N) to a second latest occurring data packet (Z) in the video stream, wherein the second latest occurring data packet is determined as:

$$Z = \frac{(\Delta J)R + H}{E},$$

wherein H is a sequence number difference between the video stream and a position of a preceding start of the intra-coded frame, and wherein $\Delta J$ is a join latency; and
combine the video stream and the dynamic burst transfer to reconstruct a video frame for display on a display device.

12. The apparatus of claim 11, wherein the join request is sent at a predetermined time that is determined by the remote network device.

13. The apparatus of claim 11, the processor further operable to combine intra-coded frame data included in the burst transfer with other data transferred over the video stream for locally reconstructing a displayable video frame.

14. The apparatus of claim 11, wherein the join request is sent to the remote network device.

15. A system, comprising:
a video server operatively connected to at least one network device capable of receiving a video stream, the video server configured to:
send a burst transfer to the network device using a dynamic transfer rate that is reduced at a transition time;
identify a minimum response time for the at least one network device to receive the video data after sending a request to join the data stream;
identify a maximum response time for the at least one network device to receive the video data after sending the join request;
determining a join latency $\Delta J$, wherein the join latency $\Delta J$ is a difference between the minimum response time and the maximum response time;
wherein the burst transfer begins at a start of an intra-coded frame;
wherein an initial portion of the burst transfer is sent at a first average rate ((1+E)R, and includes frames from the intra-coded frame to a first latest occurring frame (N), wherein R is a transfer rate of the video stream and E is a fraction amount of excess bandwidth; and
wherein a subsequent portion of the burst transfer is sent at a second average rate ER, and includes frames from the first latest occurring frame (N) to a second latest occurring frame (Z), wherein the second latest occurring frame (Z) is a last frame transferred using the burst stream before the at least one network device seamlessly starts decoding the video stream, wherein the second latest occurring frame is determined as:

$$Z = \frac{(\Delta J)R + H}{E},$$

and wherein H is a sequence number difference between the video stream and a position of a preceding start of the intra-coded frame.

16. The system of claim 15, wherein the video server is further configured to:
determine a request time using the identified minimum response time and the identified maximum response time; and
send the request to join the data stream at the determined request time.

17. The system of claim 15, wherein the video server is further configured to reduce the dynamic burst transfer to a predetermined rate that is determined based a bandwidth capability of a link for the endpoint to receive the data stream.

18. The system of claim 17, wherein the rate reduction is configured to occur no later than a time that the network device actually joins the data stream.

19. The system of claim 15, wherein the first transfer rate that is greater than a transfer rate of the data stream but less than or equal to a bandwidth capability of a link that couples the network device to a network and a remaining transfer rate that, when combined with the transfer rate of the data stream, does not exceed the bandwidth capability of the link.

20. The system of claim 15, wherein the transition time occurs a calculated amount of time later than a beginning time of the burst transfer, the calculated amount affecting when the network device sends the request to join the data stream.

* * * * *